United States Patent Office 3,594,440
Patented July 20, 1971

3,594,440
PROCESS FOR THE PREPARATION OF OLEFINS
Brian Patrick McGrath, Crowthorne, and Keith Vaughan Williams, Shepperton, England, assignors to The British Petroleum Company Limited, London, England
No Drawing. Filed Mar. 11, 1968, Ser. No. 711,878
Claims priority, application Great Britain, Mar. 16, 1967, 12,303/67
Int. Cl. C07c 3/62
U.S. Cl. 260—683D                    15 Claims

ABSTRACT OF THE DISCLOSURE

An initial mixture of an acyclic olefin, e.g., butene-2, and an easily polymerisable olefin, e.g., isobutane, is co-reacted in the presence of a catalyst comprising rhenium heptoxide on sodium poisoned alumina.

In an example a feedstock containing 6.4% by weight of butene-1, 42.4% of isobutene and 51.2% of butene-2 was passed over a catalyst at 20° C., 150 p.s.i.g. and a LHSV of 10. The catalyst was prepared by fluidising ammonium perrhenate onto alumina which had been treated with a 0.25 N solution of sodium bicarbonate. The catalyst contained 14% by weight of rhenium heptoxide and 0.25% by weight sodium ion. The reaction products, expressed as grams per 100 gram feed, were as follows, ethylene 0.4; propylene, 16.7; butene-1, 1.3; isobutene, 25.7; butene-2, 32.9; n-pentenes, 4.2; isopentenes, 18.3; and polymer, 0.4.

---

This invention relates to a process for the production of olefins.

British Pat. No. 1,064,829 discloses and claims a process for the preparation of olefins which process comprises reacting an initial mixture of two dissimilar acyclic olefins having the formulae $$R(R_1)C=C(R_2)R_3$$

and $$R_4(R_5)C=C(R_6)R_7$$

respectively, in the presence of an olefin disproportionation catalyst, the R substituents of the feed olefins representing hydrogen atoms or alkyl or aryl groups, with the proviso that not more than two of the groupings $R(R)_1C<$, $R_3(R_2)C<$, $R_4(R_5)C<$ or $R_7(R_6)C<$ are the same.

A disproportionation catalyst is a catalyst which is capable of effecting the conversion of an olefin to a mixture of olefins having higher and lower carbon numbers than the feed olefin. Such catalysts include mixtures of molybdenum oxide and alumina, preferably containing cobalt oxides, and optionally containing minor amounts of alkali metal of alkaline earth metals, molybdenum, tungsten or rhenium carbonyls supported on alumina, silica or silica/alumina, tungsten oxide supported on alumina and rhenium heptoxide supported on alumina.

It is known that certain olefins, e.g., isobutene, polymerise very readily. For this reason it has not, until recently, been possible to co-react a mixture of olefins containing an easily polymerisable olefin over a disproportionation catalyst without substantial polymerisation of the feed occurring. British Pats. Nos. 1,159,053, and 1,159,054 disclose that the addition of a minor proportion of alkali or alkaline earth metal ions to catalysts comprising molybdenum, tungsten or rhenium carbonyl supported on silica and/or alumina, or molybdena supported on alumina results in a catalyst suitable for use in the co-reaction of an olefin mixture containing an easily polymerisable olefin and does not polymerise the olefin to any great extent. Also our British Pat. No. 1,159,055 discloses that a rhenium heptoxide on alumina catalyst having similar properties may be obtained by subliming rhenium heptoxide in a stream of carrier gas and depositing on alumina located downstream of the rhenium heptoxide.

It is an object of the present invention to provide a process for the preparation of olefins by the reaction of an olefinic mixture containing an easily polymerisable olefin, e.g., isobutene, over a disproportionation catalyst.

We have now discovered that if a rhenium heptoxide on alumina catalyst is modified by the addition of a minor proportion of alkali or alkaline earth metal ions, it is suitable for use as a catalyst for the co-reaction of an olefin mixture containing an easily polymerisable olefin and does not polymerise the olefin to any great extent. Alternatively the alkali or alkaline earth metal ions may be added to the alumina support before combining with the rhenium heptoxide.

Commercially obtainable alumina usually contains a minor proportion of alkali metal ions, e.g. about 0.03% by weight of sodium ions, derived from the process of manufacture. However the present invention is based on the discovery that selective catalysts may be obtained by adding to the rhenium heptoxide on alumina catalyst or to the alumina support before combining with the rhenium heptoxide a minor proportion of alkali or alkaline earth metal ions over and above the quantity resulting from the process of manufacture. We believe that the alkali or alkaline earth metal ions are deposited on the surface.

Thus according to the present invention there is provided a process for the preparation of olefins comprising reacting an initial mixture of an acyclic olefin of formula $R(R_1)C=C(R_2)R_3$, the R substituents representing hydrogen atoms or alkyl or aryl groups, with an easily polymerisable olefin in the presence of a catalyst comprising rhenium heptoxide supported on alumina, wherein the alumina support or the rhenium heptoxide on alumina catalyst has been modified by the addition of a minor proportion of alkali or alkaline earth metal ions thereto.

The catalyst suitably contains 0.1–40, preferably 1–20, parts rhenium heptoxide per 100 parts alumina.

The optimum metal ion content depends upon the metal ion. Catalysts containing too little metal ion will retain some polymerisation activity whilst those containing too much will have a reduced catalytic effect on the co-reaction of the olefins.

Sodium, potassium and calcium ions are the preferred ions. In these instances, the catalyst should contain 0.02–5.0% by weight of added metal ion, preferably 0.1–1.0% by weight.

The incorporation of the alkali or alkaline earth metal ions into the catalyst support for use in the present invention may be brought about by known methods, for example, by treating the support with an aqueous solution of an alkali metal salt such as sodium carbonate, sodium bicarbonate or sodium acetate, and separating the solid catalyst from the liquid medium, followed by drying.

Before use in the reaction, the catalysts may be subjected to thermal activation, either in a stream of an inert gas such as nitrogen, carbon dioxide or helium, or preferably in a stream of air or oxygen followed by a final treatment in an inert gas. Suitably the catalysts are treated in air at a temperature in the range 300°–900° C. for 1 minute to 20 hours and then under similar conditions with an inert gas such as nitrogen.

Suitable easily polymerisable olefins include tertiary olefins containing the grouping

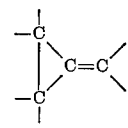

and secondary olefins contain grouping Ar—CH=C wherein Ar represents an aromatic radical.

The preferred easily polymerisable olefin is isobutene.

A very suitable feedstock for the process is a mixture consisting essentially of butene-2 and isobutene since the reaction products, propylene and 2-methylbutene-2 are very desirable olefins.

The conditions under which the olefins react may vary with the composition of the feed and the desired products. Reaction temperatures may range from −20° to +500° C., temperatures in the range 20° to 100° C., being preferred.

Reaction pressures may be in the range 0–200 p.s.i.g.

In a continuous process, reaction times may vary between 0.01 second and 120 minutes, preferably between 0.1 second and 10 minutes.

In a batch process, suitable olefin/catalyst weight ratios are in the range 1000:1 to 1:1.

If desired, the process may be carried out in the presence of an inert diluent, for example a paraffinic or cycloparaffinic hydrocarbon.

The invention is illustrated by the following examples. It is to be understood that Example 1 is provided by way of comparison only and is not in accordance with the present invention.

EXAMPLE 1

Into a vertical silica tube 30 cm. long and having an internal diameter of 12 mm. were placed in ascending order, 1 cm. quartz wool, 2.70 g. ammonium perrhenate, 1 cm. quartz wool, 5 cm. silica chips of size 18–30 BSS and 15 g. of alumina which had previously been activated at 600° C. The alumina was a poorly crystalline alumina of surface area 200 mm.$^2$/gm., pore volume 0.32 ml./gm. and an average pore diameter at 67 A.

The upper zone of alumina was heated to 550° C. in a stream of dry air sufficient to fluidise the bed. A heating furnace was then lowered to heat the ammonium perrhenate which decomposed to rhenium heptoxide which then volatilised and was carried by the air stream into the fluidised bed of alumina at 550° C. The heating and fluidising was carried on for 4 hours from the time of lowering the furnace to decompose the perrhenate. A catalyst so prepared contained 14% by weight of rhenium heptoxide and 0.03% by weight of sodium ion.

A feedstock containing 6.4% by weight of butene-1, 42.4% isobutene and 51.2% butene-2 was then passed over the catalyst at 20° C., 150 p.s.i.g. and a LHSV of 10.

The results are set out in the following table.

EXAMPLE 2

An aqueous solution of 0.25 N sodium bicarbonate was continuously circulated over a further sample of the alumina described with reference to Example 1 for 25 hours at ambient temperature. The solid was then filtered off and dried at 110° C.

The procedure described in Example 1 was then repeated using the sodium treated alumina in place of the untreated alumina previously employed. The catalyst contained 0.25% by weight sodium ion.

The results are set out in the following table.

TABLE

| Products | Example 1, g./100 g. feed | Example 2, g./100 g. feed |
| --- | --- | --- |
| Ethylene | 0.3 | 0.4 |
| Propylene | 15.5 | 16.7 |
| Butene-1 | 1.3 | 1.3 |
| Isobutene | 22.6 | 25.7 |
| Butene-2 | 32.2 | 32.9 |
| n-Pentenes | 4.6 | 4.2 |
| Isopentenes | 16.6 | 18.3 |
| Polymer [1] | 6.8 | 0.4 |
| Total | 99.9 | 99.9 |

[1] Mainly butene oligomers.

A comparison of the examples shows that the sodium treated catalyst reduced polymer formation and increased the co-reaction of the feedstock olefins, as demonstrated by the increased proportion propylene and isopentenes in the product of Example 2.

What we claim is:

1. A process for the preparation of propylene and isopentenes which comprises reacting a feedstock comprising normal butenes and isobutene, said isobutene being an easily polymerizable olefin subject to substantial polymerization over a disproportionation catalyst, in the presence of a catalyst comprising rhenium heptoxide supported on alumina in which the alumina support before combination with rhenium heptoxide or the rhenium heptoxide on alumina catalyst is modified by depositing on the surface thereof from 0.02% to 5.0% by weight of alkali or alkaline earth metal ions.

2. A process according to claim 1 wherein catalyst contains 0.1 to 40 parts by weight of rhenium heptoxide per part of alumina.

3. A process according to claim 2 wherein the catalyst contains 1 to 20 parts by weight of rhenium heptoxide per part of alumina.

4. A process according to claim 1 wherein the alkali or alkaline earth metal ions are those of sodium, potassium or calcium.

5. A process according to claim 1 wherein the catalyst contains 0.1 to 1.0% by weight of said metal ion.

6. A process according to claim 1 wherein before use in the reaction, the catalyst is subjected to thermal activation, either in a stream of an inert gas selected from nitrogen, carbon dioxide or helium, or in a stream of air or oxygen followed by a final treatment in an inert gas.

7. A process according to claim 6 wherein the catalyst is treated in air at a temperature in the range 300°–900° C. for 1 minute to 20 hours and then under the same conditions with nitrogen.

8. A process according to claim 1 wherein the feedstock comprises butene-2 and isobutene.

9. A process according to claim 1 wherein the reaction temperature is in the range from −20° to +500° C.

10. A process according to claim 9 wherein the reaction temperature is in the range 20° to 100° C.

11. A process according to claim 1 wherein the reaction pressure is in the range 0–2000 p.s.i.g.

12. A continuous process according to claim 1 wherein the reaction time is between 0.01 second and 120 minutes.

13. A continuous process according to claim 12 wherein the reaction time is between 0.1 second and 10 minutes.

14. A batch process according to claim 1 wherein the olefin feedstock to catalyst weight ratio is in the range 1000:1 to 1:1.

15. A process according to claim 1 wherein the process is carried out in the presence of an inert diluent selected from a paraffinic or cycloparaffinic hydrocarbon.

References Cited

UNITED STATES PATENTS

| | | | |
| --- | --- | --- | --- |
| 3,395,196 | 7/1968 | Heckelsberg | 260—683 |
| 3,424,811 | 1/1969 | Mango | 260—680 |
| 3,424,812 | 1/1969 | Howman et al. | 260—683 |
| 3,448,163 | 6/1969 | Howman et al. | 260—683 |
| 3,261,879 | 7/1966 | Banks | 260—683 |

PAUL M. COUGHLAN, JR., Primary Examiner

U.S. Cl. X.R.

252—463